July 5, 1949.    L. SPRARAGEN    2,475,159
ADJUSTING AND CONTROL DEVICE
Filed April 23, 1943    2 Sheets-Sheet 1
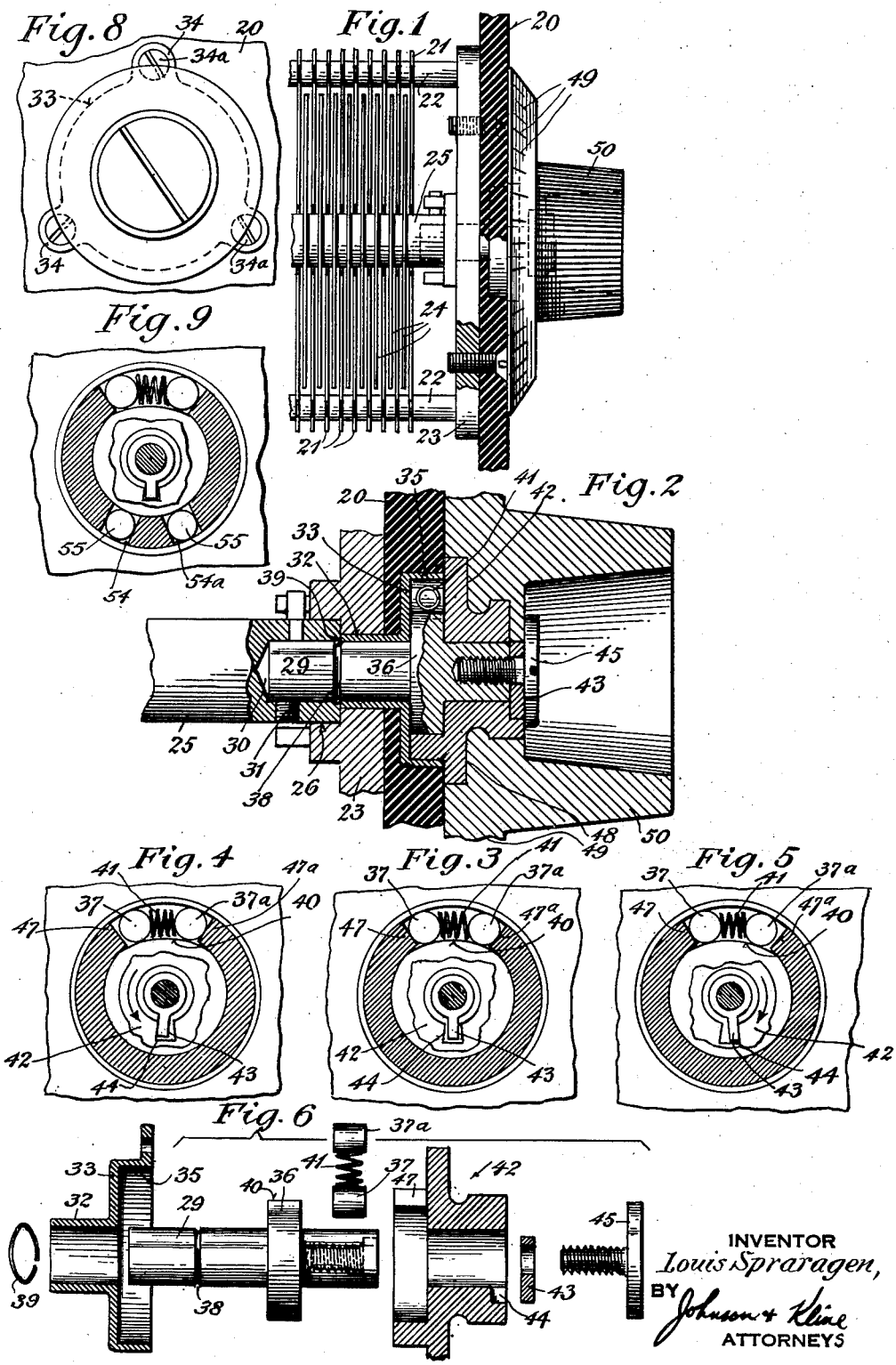
INVENTOR
Louis Spraragen,
BY Johnson + Kline
ATTORNEYS July 5, 1949. L. SPRARAGEN 2,475,159
ADJUSTING AND CONTROL DEVICE
Filed April 23, 1943 2 Sheets-Sheet 2
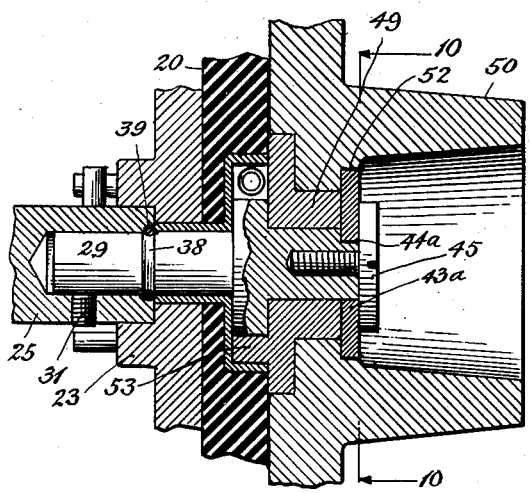
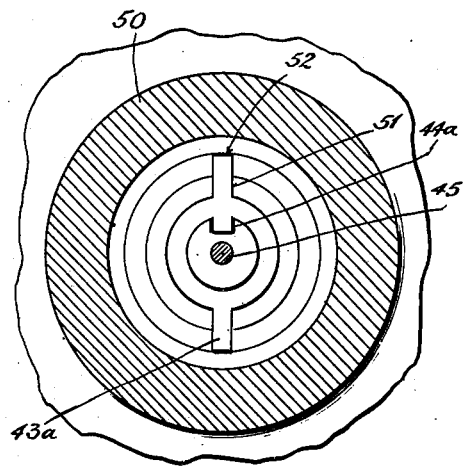
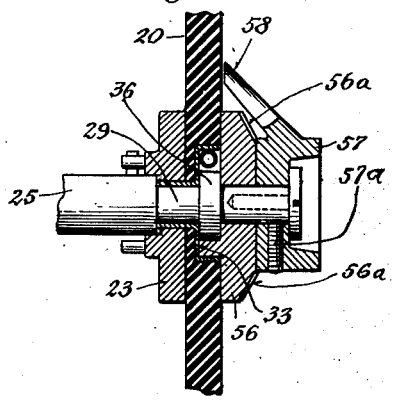
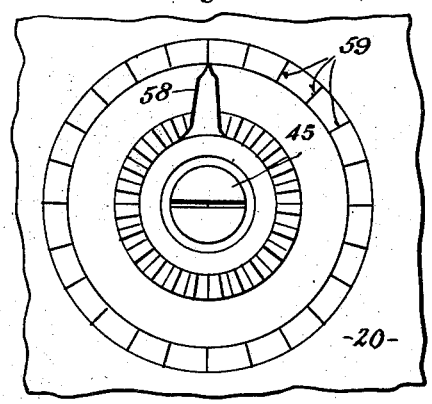
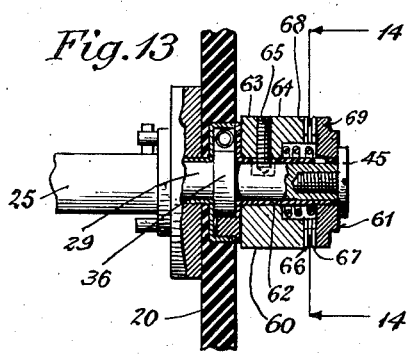
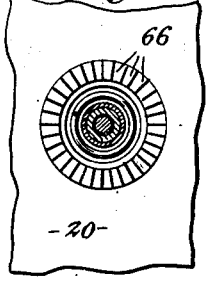
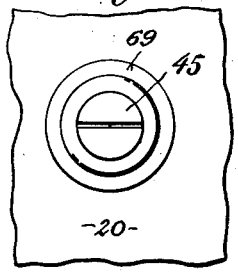
INVENTOR
Louis Spraragen
BY Johnson + Kline
ATTORNEYS Patented July 5, 1949

2,475,159

UNITED STATES PATENT OFFICE 2,475,159

ADJUSTING AND CONTROL DEVICE

Louis Spraragen, Bridgeport, Conn., assignor to Automatic Locking Devices, Incorporated, Bridgeport, Conn., a corporation of Connecticut Application April 23, 1943, Serial No. 484,191

11 Claims. (Cl. 192—8)

1

This invention relates to means for adjusting and locking the operating shafts of precision instruments, machines, and the like.

A feature of this invention is the provision of a unitary device which is adapted to be interposed between an operating shaft of a variable condenser, for instance, and the knob or finger piece for operating it to couple them together for adjusting movements and at the same time lock the operating shaft in any position to which it has been adjusted, and yet automatically release the shaft for movement as soon as the operating force is applied to the knob to adjust the shaft in either direction to the new position.

In the more specific aspects of this invention, the unitary device may also have an operating knob formed thereon as a permanent part of it, although, in the broader aspects, it may be so constructed that any suitable knob may be attached to it.

The device of the present invention is extremely advantageous when employed in environments where there is considerable vibration such as on airplanes and vessels, for while the lock is released through operation of the adjusting knob it is not released by vibratory movements, and therefore the shaft will not jog or creep out of adjusted position.

Another advantage of this invention is that, being a complete and unitary device, it may be made as a separate interchangeable unit to be installed as such in an instrument or machine for which it is designed and constructed without the necessity of fitting it to the particular instrument to which it is to be attached. Thus, it is well adapted for use in mass production of instruments and the like. Further, being a unit in itself, it may be made with precision so as to operate satisfactorily and smoothly and with a minimum of backlash and lost motion, and may be inspected and tested prior to its installation in the instrument in which it is to be used.

The device of this invention is advantageous also from operating considerations, for it eliminates the necessity of operating separate locking devices which have sometimes heretofore been used to hold the shaft against casual movement, and permits the shaft to be unlocked and adjusted by the same movement of the operating knob or the like.

Another feature of this invention is the provision of a shaft adjusting and locking unit which may be constructed entirely or partially of dielectric or non-metallic parts, and which, accordingly, may be used in instruments where the electrical capacity or magnetic effect of such metal parts might detrimentally affect the operation of the instrument or require shielding or balancing.

In the form of the invention at present preferred and illustrated herein by way of example, the adjusting and locking device comprises an anchoring member which may be attached to the panel or other fixed part of the instrument or machine and which constitutes a housing and bearing for the other parts; a coupling member rotatably mounted in the anchor member and adapted to be attached to the operating shaft of the instrument or the like and having a bearing in the anchor member; a driving member closing the front of the housing formed by the anchor member and adapted to be attached to a knob or the like either permanently or removably; opposed locking means between the anchor member and the coupling member; and resilient means urging the locking means to position to respectively lock the coupling member against casual forward and backward movement. The device also includes means operated by the driving member to release one or the other of the locking means, depending on the direction of rotation of the driving member and a lost motion driving connection between the coupling member and the driving member preferably in the form of a separate piece or key which may be placed in position when the knob or driving member is assembled on the unit and through which driving connection the coupling member is positively driven after the releasing member has been operated to release the locking means.

In the form of the invention at present preferred, the resilient means, which actuates the locking means, operates through the latter upon the releasing member producing sufficient retrograde movement of the driving member so as to cause the locking means to become effective when the operating force is removed from the driving member.

In its preferred form, the device is so constructed that the retrograde movement of the operating member for locking the shaft is extremely slight, and hence a dial or indicator used with the knob or forming part thereof may be depended upon to indicate the position of adjustment of the condenser or the like notwithstanding the inappreciable retrograde movement. However, even if the retrograde motion is appreciable or discernible, the position which the dial or indicator takes upon the knob being released will accurately indicate the position of adjustment of the shaft, since, upon release, the knob always returns to midway position between lock-releasing positions on opposite sides thereof.

In other forms of the invention the knob may be secured to the shaft to drive the same and a separate lock-releasing member employed in conjunction therewith to release the lock incident to gripping the knob to rotate the shaft.

As will appear more fully below, the device of the present invention may be made in part or entirely of molded or cast plastic material, and the resilient means for actuating the locking means may be made of rubber or other resilient non-metal material.

Other features and advantages will hereinafter appear.

In the drawings:

Figure 1 shows a partial sectional view of the present invention showing it used with a variable condenser.

Fig. 2 is an enlarged longitudinal sectional view of the control unit of Fig. 1.

Fig. 3 is a vertical section showing the adjusting device in locked position, with part of the driving member in elevation to show the lost motion driving connection.

Fig. 4 is a view similar to Fig. 3 with the driving member operated to drive the shaft in a counterclockwise direction and showing the locking means released.

Fig. 5 shows a view similar to Fig. 4 with the driving member operated to drive the shaft in a clockwise direction.

Fig. 6 is an exploded view, partly in section, of an adjusting and locking unit made in accordance with this invention.

Fig. 7 is a view similar to Fig. 2 showing a separate knob attached to the driving member.

Fig. 8 is a front view of the arrangement shown in Fig. 7.

Fig. 9 shows a view similar to Fig. 3 of a form of the invention in which antifriction bearings are employed opposite the locking means.

Fig. 10 is a sectional view, taken along line 10—10 of Fig. 7.

Fig. 11 is a longitudinal sectional view of another form of the invention.

Fig. 12 is a front view of Fig. 11.

Fig. 13 is a longitudinal sectional view of another form of the invention.

Fig. 14 is a sectional view, taken along line 14—14 of Fig. 13.

Fig. 15 is a front view of the device of Fig. 13.

For the purpose of illustration, the device has been shown in Figs. 1 and 2 as applied to an instrument having a panel 20 on which is mounted a variable condenser.

As is usual, these condensers comprise a plurality of fixed plates 21 mounted on posts 22 carried by a base 23 connected to the panel 20 of the instrument and have a plurality of interposed movable plates 24 carried by a shaft 25 having a bearing 26 in the base 23. The shaft 25 is adapted to be rotated for the adjustment of the movable plates with respect to the fixed plates.

As pointed out above, the adjusting and locking device of the present invention preferably comprises a unit which may be attached to an adjusting shaft of an instrument, machine or the like having an adjustable instrumentality therein, such, for instance, as the adjusting shaft 25 of the variable condenser shown in Fig. 1.

Accordingly, the device of this invention includes a coupling member 27 which, as shown, is in the form of a shaft 29 adapted to fit into a recess 30 in the end of the adjusting shaft 25 to be secured thereto for rotation therewith by a set screw 31. If desired, other suitable forms of couplings may be used and the type selected will depend upon the size, location and function of the adjusting shaft with which the device is employed.

The shaft 29 projects through a bearing portion 32 in an anchor member 33 which has suitable means, such as ears 34, by means of which it may be secured to a stationary part of the instrument or machine, for instance to the panel 20. It may be fastened on the surface of the support or panel by screws 34a, as shown in Fig. 8, or in a recess therein as shown in Figs. 1 and 2. The anchor member 33 is made of hard material and has a circular inner cavity, the annular wall or race 35 of which is concentric with the bearing portion 32 and the shaft 29 supported thereby.

Located in the cavity of the anchor member on the shaft 29, preferably integral therewith, is a disk 36, the peripheral surface of which is spaced from the inner annular wall of the anchor member to receive one or more pairs of cylindrical blocks 37 and 37a.

The coupling member and disk are maintained in assembled relation with the disk housed in the cavity in the anchoring member by any suitable means. In the illustrated form of the invention, the disk engages the bottom of the cavity in the anchoring member and the coupling member is held thereby against inward movement. The coupling member is provided with a groove 38 disposed at the end of the bearing when the disk is in engagement with the bottom wall of the anchoring member 33, and a spring clip 39 is snapped into the groove to engage the end of the bearing and prevent outward movement of the disk and coupling member in the anchoring device.

As will be noted in Figs. 3 to 5, the disk has a portion of its periphery provided with a surface 40 which is not concentric with the shaft and forms opposed cam means or cam surfaces for coacting with the cylindrical blocks 37, 37a to urge them against the race and into binding relation therewith as the blocks move towards the ends of this surface. The blocks are normally urged into binding position by means of a spring 41 or other resilient means.

It has been found that the angle between the cam means and the race formed at opposite ends of the surface 40, as measured between the tangent to the surface and the tangent to the race, should be sufficient to provide a binding action of the coupler member to the anchor member and yet permit ready release thereof. This angle should be between 9° and 14°, and preferably 12°.

The open end of the anchoring member is closed by a driving member 42 which maintains the blocks 37, 37a and spring 41 in assembled relation and also acts as the actuator for the shaft. The driving member is mounted on and connected to the coupling shaft to drive the same by a key 43 located in the end of the shaft and extending into a slot 44 in the driving member. The driving member is secured to the shaft in cavity-closing position by a screw 45 or similar means threaded in the end of the shaft and overlying the drive member.

The face of the driving member which overlies the open end of the anchor member is provided with projections 47, 47a which extend into the space between the race 35 and disk 36. These members, as shown in Fig. 3, extend into close proximity with the cylindrical blocks 37, 37a in their binding position and cooperate therewith to form lock-releasing means upon relative movement of the driving member on the shaft. The key is narrower than the slot in the driving member and permits the relative movement of the driving member on the shaft.

As will be noted in Fig. 3 which shows the normally locked position, the key is maintained in central position in the slot and out of driving engagement with the walls thereof and the cylindrical blocks 37, 37a are in binding relation.

When it is desired to rotate the coupling shaft in a counterclockwise direction, the driving element is turned in the direction of the arrow as shown in Fig. 4. Initial relative movement of the driving element causes the lock-releasing element 47 to engage and move the associated block 37 out of binding relation. At this time, the wall of the slot engages the key and the driving element assumes a direct driving relation to turn the shaft.

Similarly, when it is desired to rotate the shaft in a clockwise direction, the driving element is turned in the direction of the arrow as shown in Fig. 5 and the slight lost motion in the key and slot connection causes the other lock-releasing projection 47a to engage and release its associated block 37a, whereupon the wall of the slot engages the key and drives the shaft.

As soon as turning pressure is released from the driving member, spring 41 moves the cylindrical blocks back into the bites and automatically binds the coupling member and the instrument shaft coupled thereto in adjusted position, and at the same time, through coaction with the lock-releasing elements, returns the driving member to its neutral position as shown in Fig. 3.

The driving member 42 is preferably relatively light and may have a finger piece, knob, handle or other form of operating means thereon which should be symmetrically balanced so that vibrations cannot cause it to creep to an extent to overcome the spring 41 and release the locking means. As herein illustrated, the driving member and associated elements are circular and concentric with the shaft so as to provide for this balance. However, if there should be any slight unbalance in the operating member, its effect can be overcome by using a slightly stiffer spring 41 which will not be compressed by the action of the operator and will prevent undesirable creep thereby.

The outer part 48 of the driving member may serve as the knob for operating it, or, as shown in Fig. 2, the driving member may be embedded in a dial 49 having an enlarged finger grip 50. The dial may be provided with suitable indicia 49a for cooperating with a fixed point on the panel to indicate the position of the shaft.

Since the play in the lost motion connection is so slight, the dial will accurately show the adjusted position of the shaft or connected instrumentality. However, if there is appreciable play in the lost motion connection, the dial will, since it is always returned to neutral position with respect to the shaft by the spring, indicate the position of the coupling member and the shaft connected thereto.

While the dial as shown in Fig. 2 may be formed as a part of the driving member, it may also be arranged so that the dial can be mounted on the assembled unit by being slipped over the driving element and keyed thereto for rotation therewith as shown in Figs. 7 and 10.

In this construction, it may be desirable to reverse the key and slot connection shown in Figs. 3 to 5 by providing a key 43a on the driving member and a slot 44a in the shaft. The key may be located in a recess 51 in the driving member and extend into a slot 52 in the dial to connect the dial and member for rotation together. The key then extends into the enlarged slot 44a in the shaft to provide the lost motion connection. The dial 49, driving member 42 and key 43a are all locked to the coupling member by the screw 45.

As has been noted above, one or more sets of locking elements may be employed, depending upon the load to be held by the coupling unit. In this situation, the cam surfaces will be formed about the disk so as to provide for a balanced distribution therearound.

However, when the load is not a heavy one, for example that required to turn the movable plates of the condenser, only a single pair of locking elements are used. It may be desirable to provide a bearing for the disk opposite the locking elements so as to prevent distortion of the shaft due to the pressure of the locking elements against the race. This is accomplished, according to the present invention, by making the peripheral surface of the disk opposite the cam surface concentric with the race and forming a rib 53 on the driving member which extends into the space between the race and disk to substantially fill it to hold the disk and shaft against lateral movement and provide the necessary support.

As herein illustrated, the rib may extend entirely around the driving member between the two lock-releasing projections 47, 47a.

If a smoother action is desired, the rib may be cut away opposite the locking elements as at 54, 54a in Fig. 9 and balls 55 inserted therein to bear against the race and disk to provide an anti-friction bearing at this point.

The unit of the present invention is intended to be connected to the free end of the instrument shaft so that it may be readily installed in instruments and can be made up and tested separately before being fitted in the instrument. Thus, the units, since they are complete unitary devices, can be manufactured on a large scale production and supplied to the consumer for installation as required.

The coupling unit of the present invention is very simple in construction and may be readily and easily assembled into a completed unit. The steps in assembly might best be followed from a consideration of the exploded view of Fig. 6. First, the coupling shaft 29 is slipped into the bearing sleeve 32 in the anchor member until the disk 36 engages the bottom of the cavity in the anchor member 33. This will place the groove 38 adjacent the end of the bearing sleeve and the coupling shaft and anchor member can be secured together against separation by snapping the spring clip 39 into the recess to engage the edge of the bearing. Next, the two cylindrical blocks 37, 37a are dropped into the space between the cam surface 40 and the race 35 and the spring 41 inserted between them to urge them into locking position. This holds the shaft against rotation while the driving member 42 is slipped on the outer end of the shaft with the projections 47, 47a on the face thereof disposed adjacent the blocks in the space between the race and disk. The key 43 is then dropped into the recess in the end of the shaft with the projection extending into the slot 44 in the driving member. The cap screw 45 is then threaded into the shaft locking the driving member and key element to the shaft and forming a complete and unitary device.

If a dial such as shown in Figs. 2 and 7 is used, the finger piece 50 of the dial can be hollowed out as shown to facilitate assembling of the elements on the coupling shaft.

In some installations, it may be desired to have the lock-releasing member and the knob as separate elements and so arranged that they may be conjointly operated incident to the grasping of the knob and turning of the shaft.

In the form of the invention shown in Fig. 11, the anchoring member 33, coupling shaft 29 with the disk 36 having the cam surface 46 thereon and locking elements urged into locking position by resilient means 41 are the same as previously described. The lock-releasing means in this form of the invention is illustrated as an enlarged disk 56 which is mounted on the shaft. The disk is free on the shaft and has lock-releasing projections which extend into position closely adjacent the locking elements when the latter are in locking position as shown at 47, 47a in Fig. 2.

The lock-releasing means will be normally retained in inoperative position by the action of the locking elements as the spring moves them to locking position and is provided with a finger-engaging surface 56a whereby it may be rotated on the shaft to cause the lock-releasing projection to move the locking element out of the bite and release the shaft for rotation in the desired direction.

An operating knob 57 is secured to the shaft by a set screw 57a so as to positively drive the shaft when the lock is released. As herein illustrated, the knob is slightly smaller than the releasing disk 56 and terminates adjacent the finger-engaging portion 56a. If desired, the knob may be provided with a pointer 58 for cooperating with a scale 59 on the panel to accurately indicate the position of the coupling shaft and the instrumentalities connected thereto.

In operating this form of the invention, the fingers are inserted over the knob to grasp the same for turning the shaft. Incident to insertion of the fingers over the knob to grip the same, the tips of the fingers will engage the surface 56a of the lock-releasing disk and move it relative to the shaft to lock-releasing position. So long as the knob is gripped, the fingers will hold it in lock-releasing position. As soon as the fingers release the knob, the lock-releasing element moves to its normal inoperative position and the locking elements immediately hold the shaft against rotation in either direction.

Since the locking means operates instantly to lock the shaft upon release of turning pressure on the lock-releasing member, the adjusted position of the shaft will be accurately indicated by the pointer 58.

In the form of the invention shown in Figs. 13 to 15, the operating means is different from those previously described in that the knob 60 is fixed to the shaft and the lock-releasing member 61 is secured on the outer end of a sleeve 62 mounted on the shaft and projecting in front of the knob. The member 61 is slidable on the sleeve and is keyed thereto to rotate it with respect to the shaft. The sleeve has at its inner end a flange 63 carrying the lock-releasing projections which are positioned adjacent the locking elements as heretofore described.

As shown in Fig. 13, the sleeve is provided with a slot 64 through which the set screw 65 connecting the knob to the shaft extends.

The adjacent faces 66, 67 of the knob and lock-releasing member respectively are corrugated or suitably roughened so as to form a clutch between the two elements when moved into engagement. A spring 68 housed in a recess 69 in the knob normally urges the member outwardly against the head of the screw 45 and into clutch-release position.

When it is desired to operate this form of the invention, the fingers first engage the lock-releasing member and turn it and the sleeve connected thereto to cause the lock-releasing projections to release the locking elements. The member is then slid on the sleeve into engagement with the knob to be clutched thereto by the clutch elements incident to the gripping of the knob by the fingers to turn the shaft and will be so held during the operation of the shaft.

As soon as the fingers are taken away from the knob, spring 68 unclutches the knob and member and spring 41 returns the lock-releasing member to inoperative position incident to locking the shaft. If it is desired, this form of the invention, too, may be provided with an indicator or the like secured to the knob, as shown in Fig. 11, to indicate the position of the shaft.

The elements of the control unit may be stamped from sheet material, molded, cast or otherwise formed entirely of metal, partly of metal and partly of plastic material, entirely of plastic material, or by the processes involving powder metallurgy, as the particular instant installation may require, the spring may be replaced by a rubber block or other resilient non-metallic means as necessary, and the locking elements need not be cylindrical blocks, but may be balls or hollow tubes or the like.

Variations and modifications may be made within the scope of this invention and portions of the improvements may be used without others.

I claim:

1. A control unit for attachment to a shaft of an instrument for operating an adjustable instrumentality in said instrument and holding said instrumentality in adjusted position, comprising a cup-shaped anchoring member having the walls thereof form a race adapted to be fixedly mounted and having a shaft bearing formed integrally therewith and concentric with said race; a coupling shaft mounted in said bearing and having coupling means to be attached to the shaft of the instrument and having a disk thereon provided with a cam surface on its periphery, means for securing the shaft in position with the disk housed in the cup-shaped anchoring member with the periphery in spaced relation to the race and the cam surface forming therewith bites at each end; a pair of rotatable locking members disposed in the space between the cam surface and race for engagement therewith; resilient means disposed between the locking members and urging them into the bites to block the shaft against rotation in either direction; and a relatively light driving member having an operating knob mounted on the coupling shaft and having a key and slot connection thereto, the slot being slightly wider than said key whereby the driving member has slight movement relative to the shaft before assuming drive therefor, the driving member overlying and closing the space between the race and cam member and having projecting means extending into the space between the disk and race and forming lock-releasing means in proximity with said locking elements for releasing said locking elements from binding relation incident to the relative movement of the knob on the shaft under turning pressure.

2. A control unit for attachment to a shaft of an instrument for operating an adjustable instrumentality in said instrument and holding said instrumentality in adjusted position, comprising a cup-shaped anchoring member having the walls thereof form a race adapted to be fixedly mounted and having a shaft bearing formed integrally therewith and concentric with said race; a coupling shaft mounted in said bearing and adapted to be coupled to the shaft of the instrument and having a disk thereon provided with a cam surface and an opposed concentric surface on its periphery; means for securing the shaft in position with the disk housed in the cup-shaped anchoring member with the periphery in spaced relation to the race and the cam surface forming therewith bites at each end; a pair of rotatable locking members disposed in the space between the cam surface and race; resilient means disposed between the locking members and urging them into the bites to block the shaft against rotation in either direction; and a relatively light driving member having an operating knob mounted on the coupling shaft and having a key and slot connection thereto, the slot being slightly wider than said key whereby the driving member has slight movement relative to the shaft before assuming drive therefor, the driving member overlying and closing the space between the race and cam member and having a rib projecting into and filling the space between the concentric surface and race and terminating in lock-releasing means in proximity with said locking elements for releasing said locking elements from binding relation incident to the relative movement of the knob under turning pressure, said rib supporting the shaft against distortion by the pressure of the locking elements when in binding relation.

3. An instrument having adjustable instrumentalities therein for varying a condition; a shaft for adjusting said adjustable instrumentalities; a panel; and a control unit mounted on the panel and connected to the shaft, said control unit having a coupler shaft provided with means to be secured to the instrument shaft, a fixed race concentric with said coupler shaft, a disk having a cam surface mounted on the coupler shaft nested in spaced relation to the race, opposed freely rotatable locking members disposed between a cam surface on the disk and the concentric race, resilient means urging the locking members to binding relation between the cam surface and race to automatically lock the coupler shaft against rotation, an operator mounted on the coupler shaft to overlie the space between the disk and race, the operator having limited relative movement on the shaft in either direction before assuming a drive for the shaft, and means carried by the operator and disposed adjacent the locking members for releasing the locking members in response to the limited relative movement of the operator prior to assuming drive of the shaft.

4. As a new article of manufacture, a unitary device for attachment to the free end of an adjustable shaft of an instrument comprising a fixed race, a coupler shaft having means to be connected to the shaft of the instrument; a driving element having a lost motion connection with the coupler shaft for rotating the coupler shaft in either direction; wedging locking elements rotatably disposed between the fixed race and coupler shaft; resilient means for operating the locking elements to wedge the shaft in all positions of adjustment of said coupler shaft for normally preventing rotation of said shaft in either direction, said lost motion connection permitting the driving element limited relative movement with respect to said shaft from a neutral position before assuming a drive therefor; means responsive to the relative movement of said driving element on said shaft for releasing said locking means; and a dial connected to the driving element for rotation therewith and having means thereon for indicating the position of the shaft, said resilient means returning the driving element and dial to said neutral position with respect to the lost motion connection incident to operating the locking elements upon release of the operating force.

5. A controlled operator for an instrument shaft or the like comprising a shaft connected to the instrument shaft; a driving element having a key and slot connection with the shaft for rotating the shaft in either direction, a dial connected to the driving element for rotation therewith to indicate the position of the shaft, said key connecting the driving element and shaft and being slightly narrower than the slot in the shaft whereby the driving element and connected dial have limited relative movement with respect to said shaft before assuming a drive therefor, a fixed race concentric with said shaft, locking elements, and resilient means normally urging the locking elements into binding relation with the race to hold the shaft against rotation in either direction with respect to the race; and lock-releasing means carried by the driving element and coacting with the locking members for overcoming the resilient means and releasing the locking members in response to relative movement of the driving element and dial to drive-assuming position.

6. A controlled operator for an instrument shaft or the like comprising a shaft connected to the instrument shaft; a driving element having a lost motion connection with the shaft for rotating the shaft in either direction, a dial connected to the driving element for rotation therewith to indicate the position of the shaft, said lost motion connection permitting the driving element and dial limited relative movement with respect to said shaft before assuming a drive therefor; a fixed race concentric with said shaft, locking elements, and resilient means normally urging the locking elements into binding relation with the race to hold the shaft against rotation in either direction with respect to the race means disposed opposite said locking elements to hold the shaft against distortion under pressure of the locking elements; and lock-releasing means carried by the driving element and coacting with the locking members for overcoming the resilient means and releasing the locking members in response to relative movement of the driving element and dial to drive-assuming position, said lock-releasing means maintaining the distortion preventing means in position for all adjustments of the shaft.

7. A locking device for operating shafts comprising a fixed anchor member; a rotatable member mounted in the anchor member and adapted to be secured to the operating shaft; a driving member adapted to be attached to an operator or the like; dual locking means between the anchor member and the rotatable member; means resiliently urging the locking means to position to respectively lock the rotatable member to the anchor member against casual rotation with respect thereto in either direction; means operated by the driving member to release one or the other of the dual locking means depending upon the direction of rotation of the driving member; and a lost motion driving connection between the rotatable member and the driving member through which the rotatable member is positively driven after the releasing member has operated to release said locking means; and antifriction means disposed between the rotatable member and anchor member opposite the locking means for holding the rotatable member against distortion under action of the locking means.

8. An adjusting and locking device for an adjustable shaft of an instrument comprising a shaft connected to the instrument; a driving element having a lost motion connection with the shaft for rotating the shaft in either direction; automatic locking means including a fixed member and rotatable locking elements interposed between the fixed member and the shaft, and resilient means cooperable therewith operable in all positions of adjustment of said shaft for normally preventing rotation of said shaft in either direction, said lost motion connection permitting the driving element limited relative movement with respect to said shaft from a normal position thereon before assuming a drive therefor; means responsive to the relative movement of said driving element on said shaft for releasing said locking means, said resilient means returning the driving element to normal position on the shaft and the locking elements to locking position upon removal of the operating force from the driving element; and an indicator connected to the driving element for rotation therewith for indicating the position of the shaft.

9. A controlled operator for an instrument shaft or the like comprising a shaft connected to the instrument; an operator having a lost motion connection with the shaft for rotating the shaft in either direction; automatic locking means acting on the one side of the shaft adjacent the operator for normally preventing rotation of said shaft in either direction, said lost motion connection providing limited relative movement of the operator with respect to said shaft before assuming a drive therefor; means responsive to the relative movement of said operator on said shaft for releasing said locking means; and bearing means carried by the last-named means and disposed opposite the locking means for preventing the locking means from disaligning the shaft when in operation.

10. An instrument having an adjustable instrumentality for varying a condition; a frame; a shaft, the shaft being connected to the instrumentality and being relatively movable with respect to the frame for adjusting said instrumentality; wedging locking means rotatably disposed between the shaft and frame for automatically locking said shaft to the frame to hold them in adjusted relative position; and manually operable means for altering the relative positions of the shaft and frame and the instrumentality connected thereto by the application of a turning force, said means including means having limited relative movement with respect to the locking means in response to the initial application of said turning force and unwedging the locking means as a result of said relative movement, the locking means becoming automatically operable to hold the shaft and frame in adjusted position upon removal of the operating force.

11. An instrument having a variable condenser provided with movable plates for varying a condition; a fixed frame; a rotatable shaft connected to the movable plates for adjusting the position of the same, the center of gravity of the movable plates being offset from the axis of the shaft and unbalancing said shaft whereby vibrations or jars cause the shaft to rotate and change the adjustment; wedging locking means disposed between the frame and shaft for automatically locking said shaft to the fixed frame to hold the shaft against casual rotation; and manually operable means for rotating the shaft in either direction by the application of a turning force, said means including means having limited relative movement with respect to said shaft and unwedging the locking means in response to said relative movement, the locking means becoming automatically operable to hold the shaft upon removal of the operating force.

LOUIS SPRARAGEN.

REFERENCES CITED

The following references are of record in the file of this patent:

UNITED STATES PATENTS

| Number | Name | Date |
|---|---|---|
| 771,490 | Palmer | Oct. 4, 1904 |
| 945,909 | Chapman | Jan. 11, 1910 |
| 1,285,153 | Hauser | Nov. 19, 1918 |
| 1,385,785 | Hofer et al. | July 26, 1921 |
| 1,471,398 | Inglis | Oct. 23, 1923 |
| 1,529,248 | Greene et al. | Mar. 10, 1925 |
| 1,595,499 | Birk | Aug. 10, 1926 |
| 1,629,277 | Koeb | May 17, 1927 |
| 1,721,907 | Haskins | July 23, 1929 |
| 1,942,472 | Craw | Jan. 9, 1934 |
| 2,076,828 | Swartz | Apr. 13, 1937 |
| 2,251,466 | Payson | Aug. 5, 1941 |
| 2,276,777 | Horton | Mar. 17, 1942 |
| 2,300,022 | Swartz | Oct. 27, 1942 |

FOREIGN PATENTS

| Number | Country | Date |
|---|---|---|
| 263,269 | Italy | Mar. 11, 1929 |